United States Patent [19]

Sakai

[11] Patent Number: 4,881,379
[45] Date of Patent: Nov. 21, 1989

[54] CONTINUOUS QUICK FREEZING APPARATUS FOR FOOD

[75] Inventor: Tadaaki Sakai, Osaka, Japan

[73] Assignee: Nissin Gourmet Beef Co., Ltd., Osaka, Japan

[21] Appl. No.: 289,192

[22] Filed: Dec. 23, 1988

[51] Int. Cl.[4] .............................................. F25D 25/04
[52] U.S. Cl. .......................................... 62/380; 62/383
[58] Field of Search ............................ 62/63, 380, 383

[56] References Cited

U.S. PATENT DOCUMENTS

| | | | |
|---|---|---|---|
| 3,224,220 | 12/1965 | Mills | 62/380 |
| 3,584,471 | 6/1967 | Powell | 62/380 |
| 3,611,745 | 10/1971 | Schlemmer | 62/380 |
| 3,695,346 | 10/1972 | Nichols | 62/63 |
| 3,791,162 | 2/1974 | Baker | 62/380 |
| 4,517,814 | 5/1985 | Rothstein | 62/380 |
| 4,532,857 | 8/1985 | Sollich | 62/380 |

Primary Examiner—Ronald C. Capossela
Attorney, Agent, or Firm—Koda & Androlia

[57] ABSTRACT

A continuous quick freezing apparatus for food composed of a freezing container in the shape of a hollow box which is separated into an upper compartment and a lower compartment by a cooling plate. A conveying belt for conveying food slides and moves on the cooling plate and is driven by a conveying means. The cooling plate is cooled via a cooling tube disposed beneath the cooling plate in contact therewith, while the conveying belt for the food is cooled simultaneously. Thus, the food placed on the conveying belt is cooled from below. In the upper compartment of the freezing container an air cooling plate is provided and the air in the upper compartment is cooled to an ultralow temperature in windless state. Thus, freezing is promoted all around the food conveyed on the conveying belt.

5 Claims, 4 Drawing Sheets

CONTINUOUS QUICK FREEZING APPARATUS FOR FOOD

BACKGROUND OF THE INVENTION

1. Field of the Invention

This invention relates to an apparatus for freezing food, and more particularly to a continuous quick freezing apparatus for food capable of obtaining high quality frozen food, such as frozen eat, fish and other types of sea food.

2. Prior Art

Conventional freezing apparatuses may be roughly divided into two types: apparatuses for manufacturing frozen food in windless state, and apparatuses for manufacturing frozen food in airy state.

In the windless freezing apparatus, a one- or two-stage cooling coil is disposed in the top of a freezing case, and copper pressure-fit cooling plates for freezing food are arranged beneath the cooling coils as shelves. A freezing pan is placed on the cooling plate, and the food is placed on the freezing pan. The upper cooling plate moves up and down by means of a hydraulic cylinder; thus, the spacing between the upper cooling plate and the lower cooling plate can be varied.

To freeze food in this type of apparatus, first food is manually placed on the freezing pan. The freezing pan is then placed between the cooling plates. The cooling plate is lowered by a hydraulic cylinder to press tightly there against to freeze the food.

Accordingly, in this apparatus, after freezing is completed, the cooling plate is again raised by the hydraulic cylinder, and each freezing pan placed in each stage is removed. Since the frozen food has a tendency to adhere to the freezing pan, the frozen food must be manually separated from the freezing pan. Thus, job efficiency is very poor. Additionally, since the cooling plates directly contact air, steam in the air is cooled to for frost, which deposits over the entire surface of the cooling plates, lowering the freezing efficiency of the food.

In airy-type freezing apparatuses, cooling coils are provided at both the right and left end walls of the freezing case, and a blower fan is installed between the cooling coils and the inner wall. The air in the case is thus circulated by the fan. A freezing pan conveying belt is provided in the middle part of the case, and a cooling device is installed beneath the conveying belt, so as to freeze the food also from below. This cooling device has cooling coils provided on the copper plate to cool the copper plate, and the conveying belt slides on the copper plate.

In the airy-type freezing apparatus, since the air cooled by the cooling coils is circulated by a fan, the velocity of the air flow against the food is great; thus, drying of the food is promoted. This results in oxidation, which can cause discoloration of eat or fish.

Furthermore, it is necessary to remove the pan to separate the food from the freeing pan, and since this operation is not automated, it is disadvantageous from a labor-saving viewpoint.

SUMMARY OF THE INVENTION

The present invention has been devised in light of the above-described problems and disadvantages of the prior art, and its primary object is to present a continuous quick freezing apparatus for food in which the food is frozen in a windless state on a conveying belt.

Another object of the invention is to present a continuous quick freezing apparatus for food capable of manufacturing frozen products of high quality, without discoloration or deterioration of the frozen food.

Still another object of this invention is to present a continuous quick freeing apparatus for food capable of being easily manufactured in a compact structure, without requiring a special construction or special materials.

To achieve the above objects, the present invention comprises a freeing container which is a hollow rectangular box, a cooling plate disposed so as to separate the freezing container into an upper compartment and a lower compartment, a cooling tube or a refrigerant passage located beneath the cooling plate and in contact with the cooling plate, a conveying belt for the food movably disposed on the cooling plate, conveying means for the conveying belt, an air cooling plate in the upper compartment composed of a metal plate and a cooling tube or a metal plate and a refrigerant passage provided in the metal plate, a supporting plate for the air cooling plate and a vertical moving device for the support plate, and openings for the food and the conveying belt disposed at both ends of the freezing container.

The conveying belt is a metal belt made of stainless steel or the like and food can be directly laid thereon. The conveying belt slides on the cooling plate which is cooled by the cooling tube, and is thus cooled to a desired temperature.

The air cooling plate is composed of the metal plate and the cooling tube for the refrigerant in the form of piping or a refrigerant passage. By passing the refrigerant in the cooling tube or the cooling passage, the entire cooling plate is cooled, and the air in the upper compartment of the freezing container is cooled to an ultralow temperature.

When freezing eat, fish or the like, the food temperature, pH, partial pressure, concentration of salt or the like, light and other factors may cause quality deterioration such as oxidation and discoloration.

Therefore, the continuous quick freezing apparatus of this invention promotes freezing food from the entire surface via the cooled conveying belt and the cooled air which is in a windless state, so that the food may be frozen in a short time.

Since all the air surrounding the food is cooled to an ultralow temperature in a windless state, the food is not dehumidified, and drying of frozen food is prevented. In addition, changes in the concentration of salt of the food is kept to a minimum. Hence, oxidation of the food is inhibited, and decomposition due to microorganisms is restricted.

Accordingly, the development of this invention allows the cooling source provided in the cooling plate and the air cooling plate to be brine which passes through the cooling tube or the refrigerant passage installed in the cooling plate and the air cooling plate. Thus, cooling cost can be lowered.

Other features and benefits of the invention will be more clearly understood and appreciated in the following detailed description taken in conjunction with the accompanied drawings.

BRIEF DESCRIPTION OF THE DRAWINGS

FIG. 1 to FIG. 4 show an embodiment of the continuous quick freezing apparatus for food of the present invention, wherein:

FIG. 1 is a partially cut-away plan view showing the entire structure of the present invention;

FIG. 2 is a longitudinal sectional view of the same;

FIG. 3 is a sectional view along the line A—A of FIG. 2; and

FIG. 4 is a perspective view showing the entire metal plate of the cooling means.

DETAILED DESCRIPTION OF THE INVENTION

Figure 1:
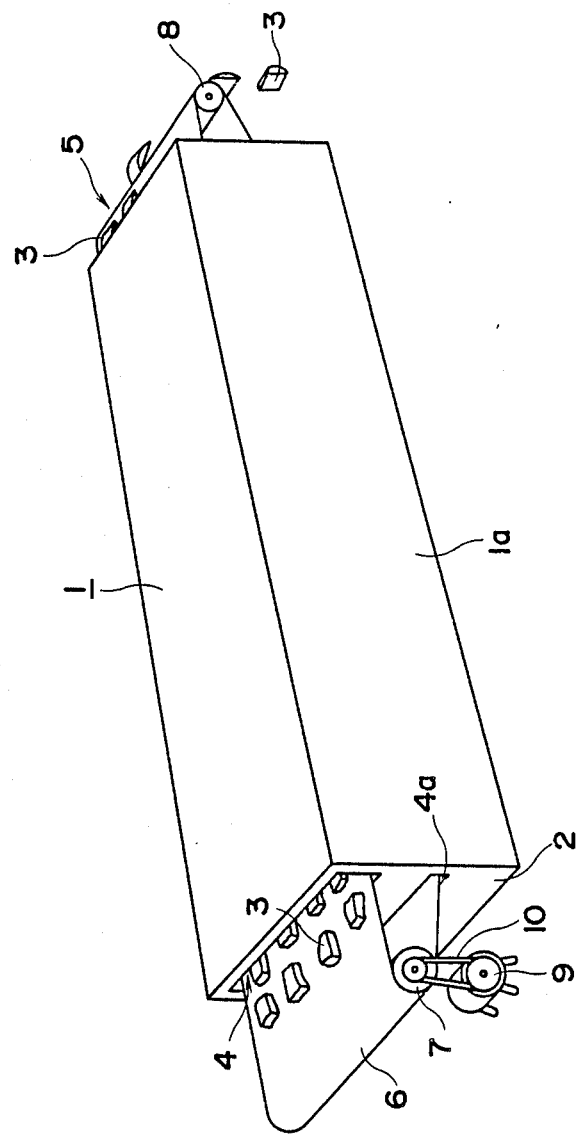

A preferred embodiment of the present invention is described in detail below reference being had to the accompanied drawings, wherein:

FIG. 1 is an overall perspective view showing an embodiment of the continuous quick freezing apparatus for food of this invention, in which reference numeral 1 is a freezing container formed in the shape of a hollow rectangular box having an inlet 4 and an outlet 5 for food 3 formed at both ends 2 and openings 4a and 5a formed thereunder.

The outer wall of the freezing container 1 is made of an insulating material.

The freezing container 1 should preferably be in the shape of a hollow rectangular box, but a hollow tubular shape may also be used.

Figure 2:
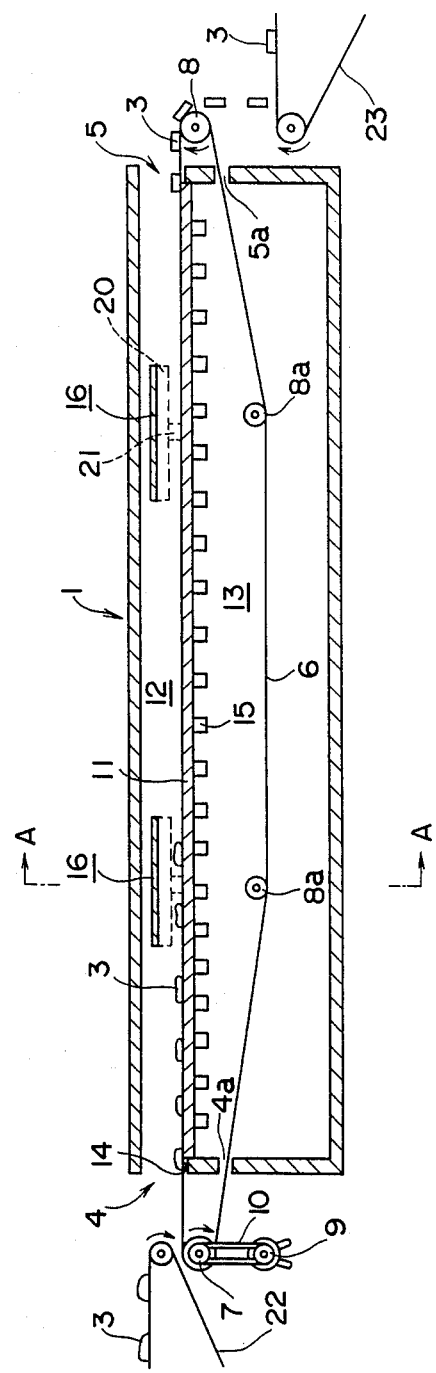
Figure 3:
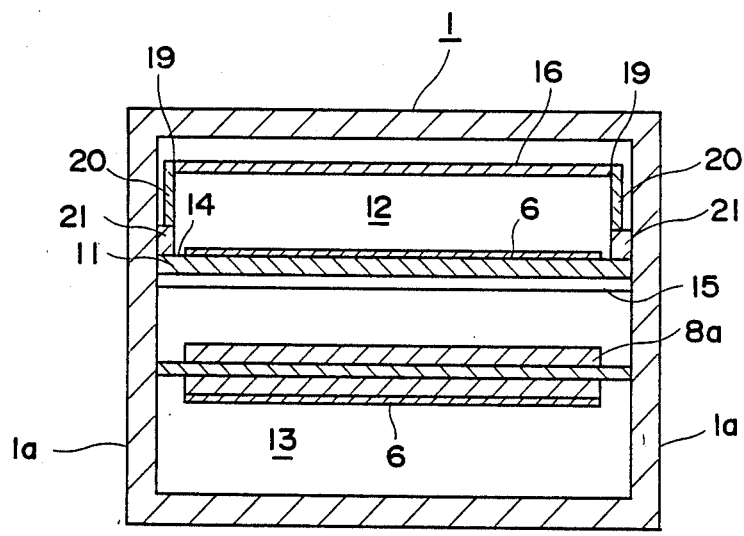

Reference numeral 6 denotes a conveying belt, which is an endless stainless steel belt, disposed between the inlet 4 and the outlet 5 of the freeing container 1 as shown in FIGS. 2 and 3. It is linked to a drive roller 7 and a driven roller 8 which are each disposed outside of both ends 2 of the freezing container 1 by way of the inlet 4 and the outlet 5 and the openings 4a and 5a provided thereunder. A motor 9 is installed under the driver roller 7, and a transmission belt 10 is linked to the shafts of the drive roller 7 and the motor 9. Rotation of the motor 9 is transmitted to the drive roll 7 so that the conveying belt 6 can be advanced. A speed change gear is provided in the motor 9; thus the running speed of the conveying belt 6 may be set to a desired speed. The driver roller 7, the driven roll 8 and the motor 9 are fixed at specified positions on the outer sides of both ends 2 of the freezing container 1.

A carry roller 8a is installed at the lower positions of the inlet 4 and the outlet 5 of the side wall 1a in the freeing container 1. The carry roller 8a is linked to the conveying belt 6 to apply tension thereto, so that rotation of the motor 9 is transmitted efficiently.

A stainless steel belt is most desirable to make up the conveying belt 6, but other metals, alloys, or nonmetals belts such as synthetic resin belts may also be used.

Reference 11 is a cooling plate for the conveying belt 6, and this cooling plate 11 is disposed between the inlet 4 and the outlet 5 of the freezing container 1, and divides the freezing container 1 into an upper compartment 12 and a lower compartment 13. The cooling plate 11 is made of a good conducting material and has a smooth upper surface 14, such as a metal and/or alloy. The conveying belt 6 is slidably formed on the cooling plate 11. A cooling tube 15 is disposed beneath the cooling plate 11, and it is in contact with the cooling plate 11. The cooling tube is responsible for cooling the cooling plate 11 and the conveying belt 6 sliding on the cooling plate 11.

The cooling tube 15 is connected to a cooling device (not shown), and, depending on the preset temperature range, cooling gas is circulating in the cooling tube 15, for example, Freon gas or the like if the set temperature range is $-50°$ to $-70°$ C., and the liquid nitrogen or the like if the set temperature is $-100°$ C.

When using antifreeze or liquefied gas, a chamber is provided instead of the cooling tube 15 to cool the cooling plate 11.

Figure 4:
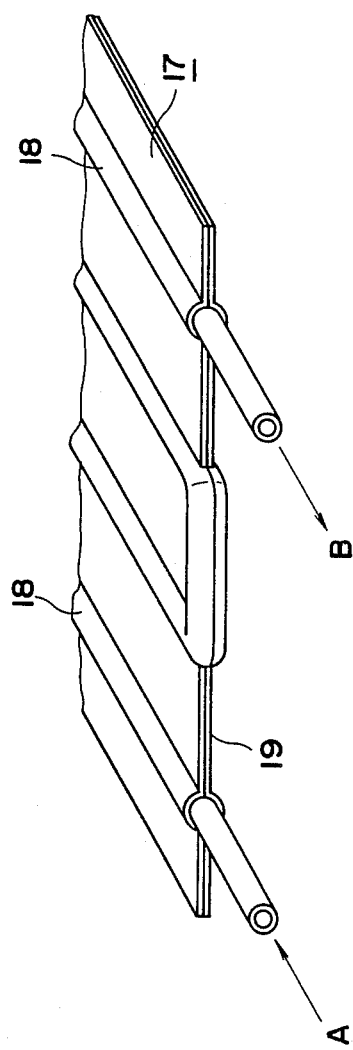

Reference numeral 16 is an air cooling plate in the upper compartment 12 of the freezing container 1. As shown in FIG. 4, it is composed of a metal plate 17 and a cooling tube 18 provided on the metal plate 17. The cooling tube 18 is connected to the cooling device (not shown), and refrigerant circulates in the cooling tube 18 from the direction of arrow A to arrow B, thereby cooling the metal plate 17. Therefore, the cooled air cooling plate 16 deprives the air in the upper compartment 12 of its heat, and the air in the upper compartment 12 is cooled to an ultralow temperature.

At both ends 19 of the air cooling plate 16, there is a support plate 20 for the air cooling plate 16 which supports the cooling plate 16.

At the middle part of the lower end of the support plate 20, there is a vertical moving device 21 for the support plate 20, and the support plate 20 is moved up and down by oil pressure or a spring. Thus, the metal plate 17 is fixed at a desired position.

The vertical moving device 21 is supported by the cooling plate 11.

Instead of installing the cooling tube in the metal plate 17, the refrigerant passage may be formed in the metal plate 17 to circulate the refrigerant and cool the metal plate 17.

The use of this continuous quick freezing apparatus for food is explained below, as follows:

The continuous quick freezing apparatus for food of this invention is installed between a material processing line for conveying the food 3, such as meat and fish cut and formed in desired sizes, to the next processing step (a packaging line 23 for packaging the frozen food). The food 3 is frozen so that it is sent on from the material processing line 22 in bulk via in-line freezing.

The food 3 conveyed by the belt of the material processing line 22 is put on the conveying belt 6, and sent into the upper compartment 12 of the freezing container 1. At this time, the conveying belt 6 contacts the upper smooth surface of the cooling plate 11 without any gap, and slides smoothly. In this way, the conveying belt 6 is quickly cooled by the cooling plate 11. Therefore, the food 3 on the conveying belt 6 is frozen from contacting the surface of the conveying belt 6.

The air in the upper compartment 12 of the freezing container 1 is cooled by the air cooling plate 16 installed in the upper compartment 12, and as the food 3 advances into the freezing operation part 12, heat is removed in a windless state. Thus, the surface temperature of the food 3 is quickly lowered so as to freeze the food 3.

The frozen food 3 is conveyed on the conveying belt 6, and drops onto the belt in the packaging line 23 to be advanced to the next processing step.

The frozen food 3 on the conveying belt 6 does not adhere to the conveying belt 6 during the freezing process. The specific reason for this is not known, but it is known that when the conveying belt 6 is cooled below a specific temperature, for example, under $-40°$ C., the food 3 does not adhere to the conveying belt 6. Therefore, the frozen food 3 passes through the driven roller 8, and smoothly drops off the conveying belt 6 to fall onto the belt in the packaging line 23.

If, however, the food 3 sticks to the conveying belt 6, since the conveying belt 6 is warped along the driven roller 8, the food 3 is easily separated from the conveying belt 6.

In the continuous quick freezing apparatus for food of this invention, meat and fish have been described as the food 3, but since the food 3 can be frozen in a windless state, it is also suited for freezing food coated with bread crumbs or the like such croquettes and fried shrimp.

I claim:

1. A continuous quick freezing apparatus for food comprising a freezing container having a hollow rectangular shape, a cooling plate for separating said freezing container into an upper compartment and a lower compartment, a first cooling means coupled to said cooling plate and located beneath said cooling plate in said lower compartment, a conveying belt disposed movably on said cooling plate for conveying food, a conveying means for driving said conveying belt, an air cooling plate disposed in said upper compartment which is composed of a metal plate and a second cooling means coupled to said metal plate, a support plate for said air cooling plate and a vertical moving device for moving said support plate and air cooling plate vertically within said upper compartment, and openings for food and said conveying belt are provided at both ends of said freezing container.

2. A continuous quick freezing apparatus for food according to claim 1, wherein said conveying belt is an endless stainless steel belt.

3. A continuous quick freezing apparatus for food according to claim 1 or 2, wherein said conveying means is composed of a drive roller, a driven roller and a carry roller.

4. A continuous quick freezing apparatus for food according to claim 1 or 2, wherein a cooling heat source of said cooling means is brine.

5. A continuous quick freezing apparatus for food according to claim 3, wherein the cooling heat source of said cooling means is brine.

* * * * *